United States Patent
Türp et al.

(10) Patent No.: US 11,296,476 B2
(45) Date of Patent: Apr. 5, 2022

(54) PYROTECHNICAL CONNECTING INTERFACE, PYROTECHNICAL CONNECTING DEVICE, AND PROCESS FOR MANUFACTURING A PYROTECHNICAL CONNECTING INTERFACE

(71) Applicant: ZF Airbag Germany GmbH, Aschau a. Inn (DE)

(72) Inventors: Thomas Türp, Rimsting (DE); Lorenz Hinterholzer, Rimsting (DE)

(73) Assignee: ZF AIRBAG GERMANY GMBH, Aschau A. Inn (DE)

( * ) Notice: Subject to any disclaimer, the term of this patent is extended or adjusted under 35 U.S.C. 154(b) by 35 days.

(21) Appl. No.: 16/764,193

(22) PCT Filed: Mar. 28, 2018

(86) PCT No.: PCT/EP2018/057974
§ 371 (c)(1),
(2) Date: May 14, 2020

(87) PCT Pub. No.: WO2019/096448
PCT Pub. Date: May 23, 2019

(65) Prior Publication Data
US 2020/0388975 A1 Dec. 10, 2020

(51) Int. Cl.
*H01R 43/18* (2006.01)
*B29C 45/26* (2006.01)
(Continued)

(52) U.S. Cl.
CPC ............ *H01R 43/18* (2013.01); *B29C 45/26* (2013.01); *B29C 45/401* (2013.01);
(Continued)

(58) Field of Classification Search
CPC .. H01R 43/18; H01R 13/405; H01R 13/5219; H01R 13/6271; B29C 45/401; B29C 45/4435; B29C 45/26; B29L 2031/36
See application file for complete search history.

(56) References Cited

U.S. PATENT DOCUMENTS 6,644,198 B1 * 11/2003 Avetisian ............... H01R 43/18
102/202.14
7,997,940 B2 * 8/2011 Regnier ............. H01R 13/5219
439/676
(Continued)

FOREIGN PATENT DOCUMENTS

DE 69308004 T2 6/1997
DE 19627635 C1 12/1997
(Continued)

*Primary Examiner* — Tho D Ta
(74) *Attorney, Agent, or Firm* — Tarolli, Sundheim, Covell & Tummnio LLP

(57) ABSTRACT

A pyrotechnical connecting interface of a pyrotechnical vehicle safety device comprises a socket which includes a housing with a plug-in port for accepting a plug, the pyrotechnical connecting interface further comprising pins which end in the plug-in port and via which electricity for activating a pyrotechnical charge can flow, the housing being an injection-molded housing and being provided with a peripheral wall which surrounds end portions of the pins at a distance therefrom and which ends in an end face on the side facing the plug; three radial undercuts for interlocking engagement with three associated latching fingers that are part of the plug are formed on the inner face of the peripheral wall, are spaced apart from each other in the peripheral direction, are entirely closed axially as well as radially outward, and are made in an injection-molding process.

13 Claims, 3 Drawing Sheets

(51) Int. Cl.
  *B29C 45/40* (2006.01)
  *B29C 45/44* (2006.01)
  *H01R 13/405* (2006.01)
  *H01R 13/52* (2006.01)
  *H01R 13/627* (2006.01)
  *B29L 31/36* (2006.01)

(52) U.S. Cl.
  CPC ....... *B29C 45/4435* (2013.01); *H01R 13/405* (2013.01); *H01R 13/5219* (2013.01); *H01R 13/6271* (2013.01); *B29L 2031/36* (2013.01)

(56) References Cited

U.S. PATENT DOCUMENTS

| | | | | |
|---|---|---|---|---|
| 9,455,519 B2 * | 9/2016 | Isenmann | ............ | H01R 13/405 |
| 2010/0173510 A1 * | 7/2010 | Schmidt | ............. | H01R 13/5219 |
| | | | | 439/271 |

FOREIGN PATENT DOCUMENTS

| | | |
|---|---|---|
| DE | 102007014044 A1 | 9/2007 |
| DE | 102012109820 A1 | 4/2014 |
| DE | 102014107762 A1 | 12/2015 |
| EP | 1891707 A1 | 2/2008 |
| JP | 2008293822 A | 12/2008 |
| WO | 2008096277 A2 | 8/2008 |

\* cited by examiner

PYROTECHNICAL CONNECTING INTERFACE, PYROTECHNICAL CONNECTING DEVICE, AND PROCESS FOR MANUFACTURING A PYROTECHNICAL CONNECTING INTERFACE

CROSS-REFERENCE TO RELATED APPLICATION

This application is a national stage of International Application No. PCT/EP2018/057974 filed Mar. 28, 2018, the disclosure of which is incorporated herein by reference in its entirety, and which claimed priority to PCT Patent Application No. PCT/EP2017/079571, filed Nov. 17, 2017, the disclosure of which is incorporated herein by reference in its entirety.

BACKGROUND

The present disclosure relates to a pyrotechnical connecting interface of a pyrotechnical vehicle safety device, comprising a socket which includes a housing with a plug-in port for accepting a plug, and comprising pins which end in the plug-in port via which electricity for activating a pyrotechnical charge can flow. Furthermore, The relates to a pyrotechnical connecting device comprising a pyrotechnical connecting interface and a process for manufacturing a pyrotechnical connecting interface.

Pyrotechnical vehicle safety devices are, for example, actuators for seat belts, gas generators for inflation of airbags or drives that can be quickly released. The electric signals for triggering the pyrotechnical charge are passed from a control unit to the pyrotechnical igniter, wherein so-called electric pyrotechnical connecting interfaces are required. Such a pyrotechnical connecting interface usually comprises a socket into which a plug is to be plugged, the plug usually including elastic fingers having latch hook-type ends which engage in the housing. Usually dimensions of such sockets and, resp., plugs to be plugged into the latter are standardized so that, for example, for such sockets a value of 11.1 mm has become established for accepting a plug with respect to the inner diameter of a respective plug-in port.

From prior art, for example from the laid-open documents EP 1891 707 A1, JP2008-293822 A, DE 19627635 C1, DE102007014044 A1 or WO2008/096277 A2, pyrotechnical connecting points comprising corresponding sockets are known, wherein there each of the respective sockets shows a radially circumferential continuous undercut. Such complete radially circumferential undercut which has no interruptions cannot be technically manufactured by one (single) plastic injection molding process, as a required demolding after an injection molding process cannot be realized with respect to the injection molding tools. Referring to the radially circumferential undercut in the socket, as shown in each of the afore-mentioned laid-open documents, this means that such undercut can be realized, for example, by material-abrading machining, e.g. turning, on a socket blank made from metal or else a socket blank made from plastic before—but not by one (single) injection molding process, as explained before. Such manufacture of a known radially circumferential undercut is complex and cost-intensive.

SUMMARY

It is the object of The present disclosure to overcome the afore-mentioned drawback and to improve a pyrotechnical connecting interface and, resp., a process for manufacturing the same so that a pyrotechnical connecting interface which can be manufactured at extremely low cost can be realized.

This is achieved by a pyrotechnical connecting interface of a pyrotechnical vehicle safety device, comprising a socket which includes a housing with a plug-in port for accepting a plug, and comprising pins which end in the plug-in port via which electricity for activating a pyrotechnical charge can flow, the housing being an injection-molded housing and being provided with a peripheral wall which surrounds end portions of the pins at a distance therefrom and which ends in an end face on the side facing the plug, three radial undercuts spaced apart from each other in the peripheral direction being formed on the inner face of the peripheral wall for interlocking engagement with respective associated latching fingers on the plug side, wherein the three undercuts are entirely closed axially and radially outward and are manufactured by injection molding.

The socket according to the present disclosure enables a water-tight coupling to a plug, as the undercuts are open to the plug-in port only but not to the remaining environment, all of the three undercuts being produced by injection molding, especially by one single injection molding process. This helps provide an extremely cost-efficient pyrotechnical connecting interface with an equally cost-efficient socket.

Of preference, the three undercuts are evenly spaced apart from each other radially along the periphery of the housing of the socket, wherein, of course, also different spaces between the three undercuts can be used to allow for an unambiguous orientation of the plug and the socket.

The exposed end portions of the pins should be located completely inside the plug-in port, i.e. they should not project outwardly from the end face. In addition, or alternatively, the pins may be directly embedded in the socket. This means that the pins are directly integrated in the injection-molded housing of the socket, i.e. they are surrounded in portions by the material of the socket.

Consequently, the pins can be embedded in an end wall of the socket which so-to-speak forms the bottom of the plug-in port. Said embedding is carried out preferably by extrusion-coating of the pins, especially during manufacture by injection molding of the socket itself.

The end wall has, for example, an outer wall portion integrally merging into the peripheral wall and comprising an opening so that the end wall and the outer wall portion are jointly injection-molded. The opening is closed by a stopper cast or injected therein through which the pins are projecting. This means that at first the peripheral wall including the outer wall portion is injection-molded, then the pins are passed through the opening and finally the opening is closed while forming the stopper. Alternatively, it is also possible to integrate or embed the pins into the socket when manufacturing the socket itself in one single injection molding process, as will be described in greater detail further below concerning a method for manufacturing the pyrotechnical connecting point. Accordingly, there will no longer exist any stopper as a separate component taken per se, but the stopper can be understood to be quasi integrated in one piece with the housing of the socket.

The housing is an injection-molded housing, with the three undercuts being produced during injection-molding.

The end wall can include, toward the plug-in port in the area of the pin or pins, resp., at least one axial extension asymmetrical toward a central axis. Said extension is e.g. a T-shaped extension, when viewed in the axial view or in a top view. The extension or extensions serve(s) for achieving an unambiguous peripheral orientation of the socket and the plug by the plug having corresponding recesses on the front face. Due to such Poka-Yoke features consequently only one correct inserting position is resulting for the plug.

The plug-in port is water-tight except for a port mouth delimited by the peripheral wall and the end face.

The end face should be peripherally closed and should be circumferential in a planar manner to allow contact of a seal.

Each of the three undercuts can be closed off at their ends close to the end face by a radial delimiting area, wherein especially the opposite delimiting area extends tapered toward the center of the plug-in port. The radial delimiting area enables a hook-shaped end of each finger to act safely on the plug.

Only the socket itself is provided as a pyrotechnical connecting interface of the present disclosure. A pyrotechnical connecting device of The present disclosure further comprises, apart from the pyrotechnical connecting interface, a plug insertable into the plug-in port. Said plug has at least one extension or head protruding into the plug-in port with a seat for the pins, wherein the plug includes a counter end face opposed to the end face of the socket and sealing the opposed end face in a water-tight manner, especially via an O-ring positioned between the counter end face and the end face.

Hence, between the end face and the counter end face an elastic ring seal can be provided in the form of an O-ring which can be fastened both to the socket and to the plug, though preferably to the plug.

Three axial latching fingers each of which includes a hook-shaped end for engaging in the respective undercuts may be formed integrally with the plug.

Moreover, the present disclosure relates to a process for manufacturing a pyrotechnical connecting interface of a pyrotechnical vehicle safety device, especially a pyrotechnical connecting interface as afore-described, the process comprising the following steps of:

a) Providing an injection molding tool having a mold core which has a longitudinal axis, and providing at least one angular ejector adapted to be moved relative to the mold core; then b) arranging the at least one angular ejector on an inner inclined face of the mold core such that a cavity for a socket to be produced by injection molding is resulting, the cavity forming an undercut for the socket which is entirely closed axially and radially outward; after that c) filling plastic material into the cavity by one single filling operation and thus manufacturing at least a subarea of the socket; then d) forming and ejecting the at least one subarea of the socket by moving the at least one angular ejector along the inner inclined face of the mold core toward an ejecting direction, the ejecting direction forming with the longitudinal axis of the mold core a demolding angle which has an angular value ranging from 1° to 10°, especially an angular value ranging from 2° to 5°.

By arranging, on the one hand, the at least one angular ejector on or, resp., inside the mold core such that a cavity is formed with an undercut for a socket to be produced by injection molding, and by arranging, on the other hand, the at least one angular ejector such that the ejecting direction thereof forms and, resp., encloses with the longitudinal axis of the mold core a demolding angle having a very specific angular value, viz. an angular value ranging from 1° and 10°, especially an angular value ranging from 2° to 5°, after the injection process, viz. the filling of plastic material into the cavity, a socket which forms an undercut that is entirely closed axially and radially outward can be manufactured by removing and, resp., ejecting the socket, wherein at the same time an optimized minimum extending distance for the at least one angular ejector is reached so that a corresponding working space required by such injection molding process advantageously requires minimum space.

Preferably, in such method in step a) three angular ejectors adapted to be moved relative to the mold core are provided, wherein in step b) the three angular ejectors are arranged on respective inner inclined faces of the mold core in such way that the cavity for the socket will form, wherein the cavity now forms three undercuts separate from each other for the socket, wherein each undercut per se is entirely closed axially and radially outward, and wherein after filling the cavity in step d) demolding is carried out such that the three angular ejectors are moved substantially simultaneously, each angular ejector in the direction of its respectively assigned ejecting direction, wherein each of the respective ejecting directions forms with the longitudinal axis of the mold core a demolding angle in each case having the same angular value ranging from 1° to 10°, especially an angular value from 2° to 5°. By such process, a socket including a total of three undercuts separate from each other and each per se being entirely closed axially and radially outward can be manufactured in one single injection molding process. Demolding or ejecting the socket is enabled by correspondingly moving the respective angular ejectors simultaneously under the respective demolding angle, wherein optimized minimum space requirements of the entire injection molding tool with the travel distances thereof and, resp., the ejecting distances of the angular ejectors is achieved.

In particular, the afore-mentioned process can be carried out such that the three angular ejectors, when viewed in the top view with respect to their arrangement at the molded body, can be disposed on the respective inner inclined face of the mold core so that the three angular ejectors are positioned along a joint imaginary circle at equal radially circumferential spaces relative to each other so that there will form a respective angular distance of 120° from one angular ejector to the next angular ejector located on the imaginary circle. This helps achieve an especially economic process in terms of space requirements and costs.

Preferably, the afore-mentioned processes can be further optimized to the effect that in the mold core two bores are arranged, substantially in parallel to the longitudinal axis of the mold core, wherein before filling the cavity a pin via which electricity can flow for activating a pyrotechnical charge is inserted into each of the bores such that the pins abut on and especially protrude into the cavity so that after filling the cavity with plastic material the subarea of the socket is manufactured in such a way that the pins are directly embedded in the socket. Advantageously, in this way the pins can be integrated, as electric connecting cables for electric signal transmission and thus for triggering a pyrotechnical charge, also into the socket in one procedure or, resp., in one injection molding step. This is advantageous in such a way that the pins are connected to be water-tight in the socket and thus no further effort has to be made concerning a moisture-tight sealing of the pins from the environment.

In this context, it is also possible that the pins are encompassed by a prefabricated pyroelectrical igniter which is inserted, prior to filling the cavity, with the axial ends of the pins into the two bores such that areas of the pins and/or adjacent further areas of the prefabricated pyroelectrical igniter abut on or protrude into the cavity so that, after filling the cavity, the pyroelectrical igniter is at least partially embedded directly into the socket. This offers the advantage that the pins need not be inserted, each separately per se, into the bores inside the mold core, but the two pins can be positioned in the bores as components of a prefabricated subassembly with the prefabricated pyroelectrical igniter with minimum effort.

BRIEF DESCRIPTION OF THE DRAWINGS

Further features and advantages of the present disclosure will be evident from the following description and from the following drawings which will be referred to, wherein.

DETAILED DESCRIPTION

Figure 1:
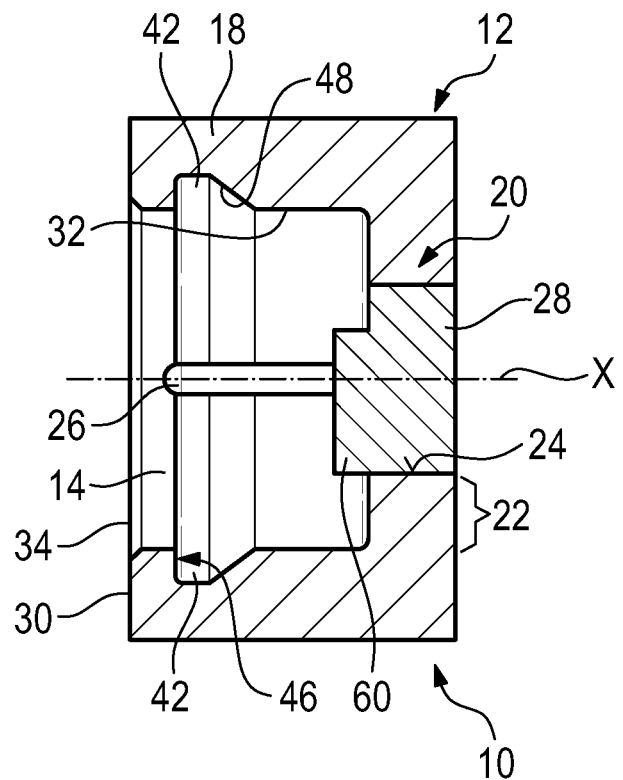
FIG. 1 shows a longitudinal sectional view across a socket of the pyrotechnical connecting interface according to the present disclosure.
Figure 2:
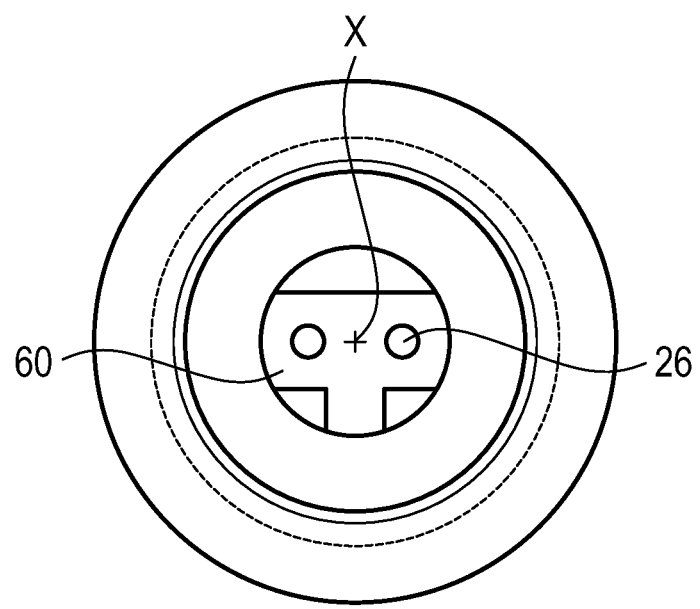
FIG. 2 shows an axial view of the socket according to FIG. 1.

In the FIGS. 1 and 2, a socket 10 of an electric pyrotechnical connecting interface is shown via which electricity flows to a pyrotechnical charge of a vehicle safety device, for example an actuator for a seat belt.

Figure 4:
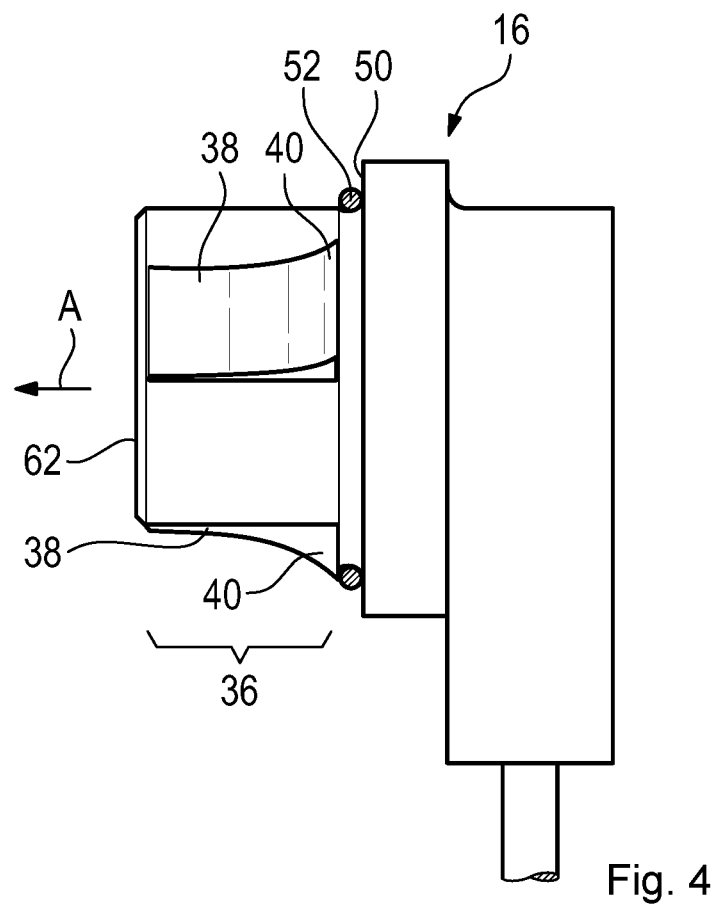
FIG. 4 shows a lateral view of the plug as further part of the pyrotechnical connecting interface according to the present disclosure.

The socket 10 comprises a housing 12 made from plastic which is produced by injection molding. The housing 12 includes a plug-in port 14 for a plug 16 shown in FIG. 4, the plug-in port being closed and delimited by a circumferentially closed peripheral wall 18 and a bottom-side end wall 20.

The end wall 20 is formed, in this example embodiment, by two injection molding steps, i.e. a first step in which the circumferential wall 18 and an outer wall portion 22 of the end wall 20 integrally merging into the circumferential wall 18 are produced.

Due to the fact that the outer wall portion 22 includes an opening 24, electric pins 26 can be inserted into said opening 24 and then can be embedded into the end wall 20 in a water-tight manner by a subsequently injected or cast stopper 28. The stopper 28 also closes the opening 24.

As an alternative, this can also be carried out in one single injection molding step by providing, in an appropriate injection mold, also recesses (bores) for accepting the pins 26 in which the pins 26 are prepositioned prior to the single injection molding step. Then, during said injection molding step, the housing 12 is completed with its peripheral wall 18, its end wall 20 and the stopper or, resp., a space which such stopper would form so that the pins 26 are equally embedded in the end wall 20 in a moisture-tight or, resp., water-tight manner. A stopper per se does no more exist here, of course, as the stopper is quasi jointly injection-molded, i.e. merges integrally into the housing 12 or is integrated in the latter. Consequently, in this case the end wall 20 is configured without the opening 24. This alternative will be described in more detail further below concerning a manufacturing process.

The pins 26 end with the shown end portions in the plug-in port 14, when viewed in the axial direction, in front of an end face 30 by which the peripheral wall 18 ends axially to the side of the plug. Thus, the end portion of each pin 26 is completely located inside the plug-in port 14.

The pins 26 have a gap radially to the inner face 32 of the peripheral wall 18, see FIG. 2.

The plug-in port 14 starts with a so-called port mouth 34 which starts axially level with the end face 30 and is circumferentially delimited by the latter.

Apart from said port mouth 34, the plug-in port 14 is water-tight and moisture-tight toward the environment.

The end face 30 is moreover planar and annularly closed and is located in a radial plane relative to a central axis X.

For fixing the plug 16 in the plug-in port 14, the plug 16 includes plural integrally formed elastic latching fingers 38 which extend in the axial direction at its head 36 adapted to be plugged into the plug-in port 14.

In the present example embodiment, there are three identically configured latching fingers 38 evenly spread over the periphery. Each of said latching fingers has a hook-shaped end 40 pointing radially outwardly and ending at the portion of the head 36 which is located opposed to the plug-in direction A.

The hook-shaped ends 40 can engage in radial undercuts 42, in this case three circumferentially spaced undercuts 42, on the inner face 32 of the peripheral wall 18. The three undercuts 42 are arranged along the periphery of the peripheral wall 18 of the housing 10 at regular distances from each other, i.e. at an angular distance of 120° from each other.

Said undercuts 42 are manufactured during injection molding, especially by one single injection molding step, by providing axially and radially movable slides or angular ejectors in the injection mold. The undercuts 42 are open toward the plug-in port 14 only, otherwise they are completely closed to the outside, i.e. both in the axial and in the radial direction, so that moisture or water is prevented from penetrating.

The undercuts 42 have a bounding face 46 radial with respect to the central axis X at the end close to the end face 30 and a bounding face 48 extending tapered toward the central axis X.

In order to optimally seal the plug-in port 14, the plug 16 may include a counter end face 50 which in the inserted state is opposed to the end face 30 and is equally planar. Between the end face 30 and the counter end face 50 an O-ring 52 placed in a groove is clamped which serves for water-tight sealing of the plug-in port 14. The O-ring 52 usually is part of the plug 16.

In the head 36 of the plug 16 electrically conducting seats for the pins 16 are naturally provided. Since the latching fingers 38 are evenly spread along the periphery, the peripheral orientation of the plug 16 relative to the socket 10 is achieved by one or more asymmetrical extensions 60 axially protruding from the end wall 20 into the plug-in port 14. Said extension 60 or said extensions is/are asymmetrical relative to the central axis X.

In the example embodiment according to FIG. 2, there is provided an extension 60 which is T-shaped. The head 36 of the plug 16 has a recess at its end face 62 which is complementary thereto. To simplify the drawings, the electric conductor to the pins 26 is not shown in FIG. 1.

Figure 3:
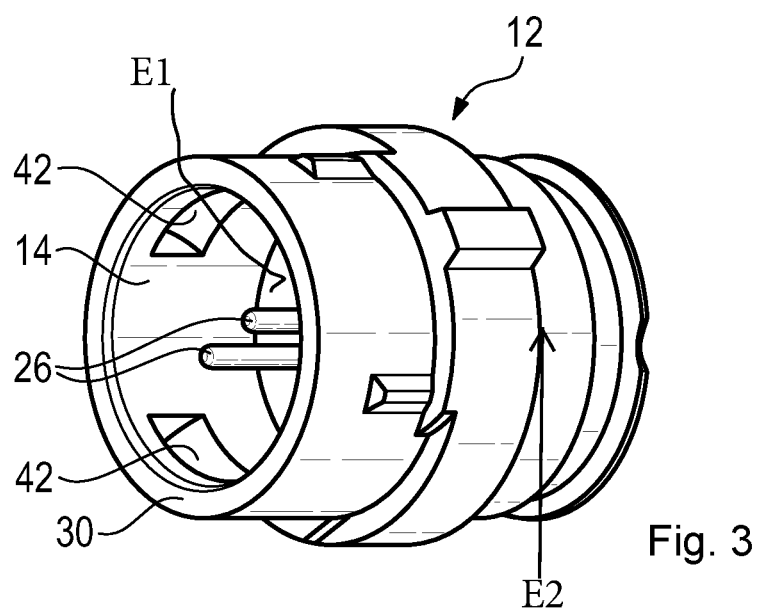
FIG. 3 shows a perspective view of the socket according to FIG. 1.

In FIG. 3, for the socket 10 a plane E1 is defined which quasi comprises the plane of a bottom of the plug-in port 14 of the socket 10, with an axial viewing direction into the plug-in port 14 in the direction of the pins 26. In other words, the plane E1 defines the plane of the end wall 20 in the radial direction facing the plug-in port 14 of the socket 10. In addition, here another plane E2 of the socket 10 is defined which, with respect to the end face 30 of the socket 10, is positioned further away in the axial direction than the plane E1, wherein the plane E2 comprises a front-side end of a radially circumferential outer step of socket 10. Both planes E1 and E2 are important to the FIG. 5 described in the following.

Figure 5:
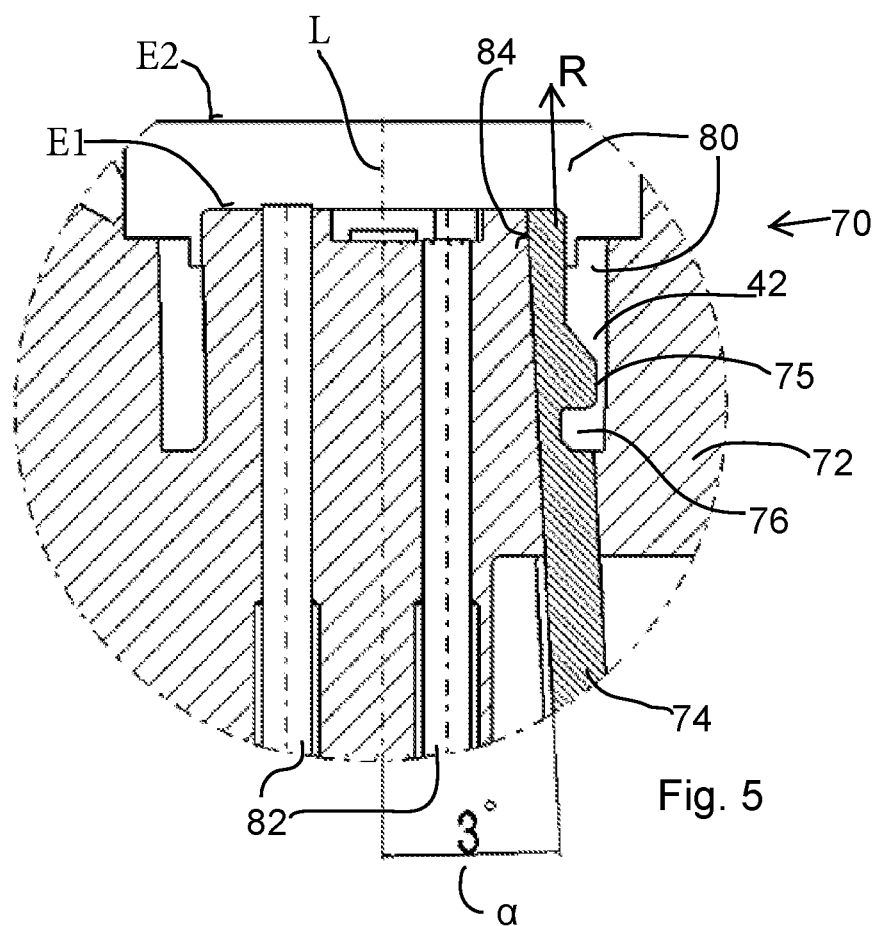
FIG. 5 shows a lateral view in section of the mold core as a subarea of an injection molding tool prior to an injection molding process.

In FIG. 5, in the lateral view a sectional representation of a mold core 72 in an injection molding tool 70 is shown, wherein merely a subarea thereof rather than an entire plastic injection molding tool is illustrated. Inside the mold core 72 having a longitudinal axis L, an angular ejector 74 which is adjacent to an inner inclined face 84 of the mold core 72 is positioned. The angular ejector 74 is movable in an ejecting direction R relative to the mold core 72 and, resp., is displaceable along the inner inclined face 84 of the mold core 72 correspondingly in the ejecting direction R.

The or such angular ejector 74 is or will be positioned, according to the preferred embodiment of the present disclosure described here, opposite to the or such mold core 72 so that a demolding angle α having an angular value from 2° to 5°, especially of 3°, is resulting.

In other words, the angular ejector 74 is disposed so that, between the longitudinal axis L of the mold core 72 and the ejecting direction R or, resp., between the longitudinal axis L of the mold core 72 and the inner inclined face 84 of the mold core 72 to which the angular ejector 74 is movably adjacent, the demolding angle α has an angular value of 3°.

The plastic injection molding tool, as illustrated in cutouts in FIG. 5, includes two further angular ejectors 74 which are not evident in the sectional view of FIG. 5. Each of the total of three angular ejectors 74 is structured analogously to the afore-described one angular ejector 74 and is arranged on or inside the mold core 72 radially circumferentially at respective equal distances, viz. at a respective angular distance of 120°, from the angular ejector 74 closest in the radial direction.

The mold core 72 and all three angular ejectors 74 are made from metal and are assigned to each other so that, as evident from FIG. 5, a cavity 80 is formed which can be filled with plastic material during injection molding. In other words, the three angular ejectors 74 jointly with the mold core 72 form a hollow, viz. the cavity 80, which constitutes a space to be filled with plastic material for providing the socket 10 and, resp., for manufacturing at least a subarea of the socket 10.

As shown in FIG. 5, the angular ejector 74 includes a projection 75 having a slant and a groove 76 such that in this area for the cavity 80 the undercut 42 for the socket 10 to be manufactured is formed. In other words, the angular ejector 74 with its projection 75 and its groove 76 is formed with a contour geometrically complementary to the undercut 42 to be formed of the socket 10 so that, when filling the cavity 80, in this area of the angular ejector 74 the corresponding undercut 42 is formed and, resp., produced in the socket 10. All three angular ejectors 74 show such corresponding complementary contour, as described before by way of the example of the one angular ejector 74 of FIG. 5, so that after filling the cavity 80 also three corresponding separate undercuts 42 spaced apart in the radial direction will form in the socket 10.

As is evident from FIG. 5, the cavity 80 has two planes E1 and E2 which, after filling the cavity 80 with plastic material for producing the socket 10, then complementarily correspond to the planes E1 and E2 of the socket 10 itself as described further above. In other words, the cavity 80 has a plane E1 which, after the injection molding process, causes the plane E1 of the end wall 20 facing the plug-in port 14 of the socket 10 to be formed. Analogously, the plane E2 of the cavity 80 causes the plane E2 which comprises the front-side end of a radially circumferential outer step of the socket 10 to be formed after the injection molding process.

FIG. 5 illustrates that the end face of the angular ejector 74 facing the planes E1 and E2 terminates in the plane E1. The surface of said end face of the angular ejector 74 is thus aligned with or in the plane E1. Accordingly, all three angular ejectors 74 are aligned with the plane E1 of the cavity 80 in such a way that all end faces of the angular ejectors 74 together end in or, resp., are aligned with the plane E1. Consequently, no angular ejector 74 projects from the plane E1 in the direction of the plane E2.

Two bores 82 which are arranged substantially in parallel to the longitudinal axis L of the mold core are disposed in the mold core 72, as FIG. 5 illustrates. The bores 82 are configured as free spaces for the pins 26 and have an appropriate diameter so that the pins 26 can be inserted into the bores 82 prior to the injection molding process. For the sake of clarity, pins 26 inserted in the bores 82 in this way are not shown in FIG. 5. The pins 26 can be inserted from the top (with respect to FIG. 5) either individually or else as parts of a prefabricated pyroelectrical igniter into the bores 82 advantageously so far that the pins 26 still protrude into the cavity 80 over a certain length. Accordingly, after the injection molding process a certain length or coverage over which the pins 26 are tightly embedded in the plastic body of the socket 10 is safeguarded.

All three angular ejectors 74 are appropriately arranged corresponding to the afore-described angular ejector 74, as it is evident from FIG. 5. This means that between the longitudinal axis L of the mold core 72 and the respective ejecting directions R of all angular ejectors 74 a demolding angle α having an angular value of 3° is resulting.

The previously described configuration of the injection molding tool and, resp., of the mold core 72 including the three angular ejectors 74 and the pins 26 inserted in the bores 82, according to FIG. 5, corresponds to a condition prior to an injection molding process to be carried out. After providing the injection molding tool, the cavity 80 is filled with plastic material in one single injection molding process. After that, all of the three angular ejectors 74 are moved, substantially simultaneously, in their respective ejecting direction R upwards (FIG. 5), i.e. in the direction of the plane E2 of the cavity 80, at least so far that the socket 10 made from plastic material can be demolded and, resp., removed at its three undercuts 42 produced from the injection molding tool.

It has turned out by elaborate test runs that for a socket 10 to be manufactured, especially for a socket having a typical plug-in port of 11.1 mm in the field of application of a pyrotechnical connecting interface, a range from 1° to 10° should be selected for the demolding angle α for optimum demolding and, resp., ejecting of the socket 10 with its undercuts 42. An extremely optimized manufacturing process for the socket 10 has turned out with a demolding angle α having an angular value of 3°. In an especially optimized manner, such injection molding process can be carried out with three angular ejectors 74 each of which includes, with its respective ejecting direction R, a demolding angle α of an angular value of 3° with respect to the longitudinal axis L of the mold core 72. Concerning such optimized process, especially the following advantages are stated. For the demolding by the movement of the angular ejector 74 and, resp., the three angular ejectors 74, extremely short and optimized travel distances in the ejecting direction R can be reached. This means that the space required for the entire injection tool, especially when it is a multi-tool in which plural sockets 10 can be simultaneously manufactured, is extremely small, as the moving distance, i.e. the travel for angular ejectors 74 required for enabling the socket 10 to be demolded at its undercuts 42, can be kept extremely small. In addition, an extremely robust, mechanically balanced and stable ejection or demolding which allows for minimum tool loads, especially with respect to the angular ejectors 74, can be ensured by said specific value for the demolding angle α.

Figure 6:
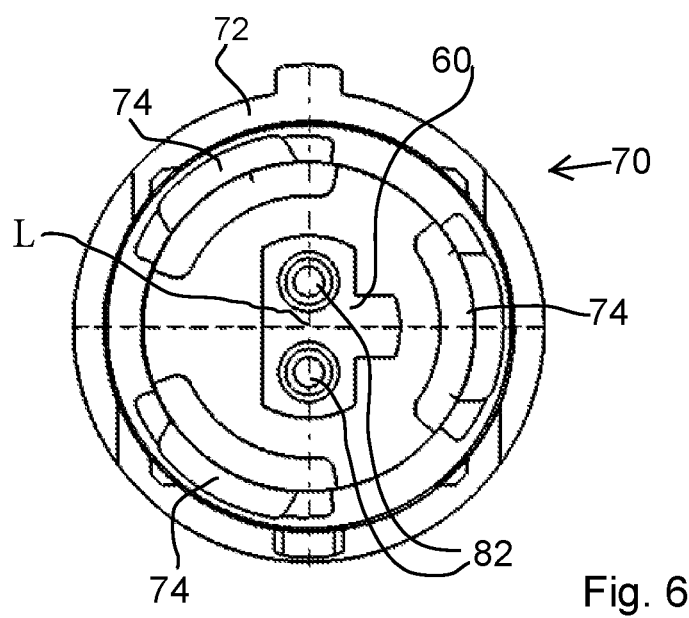
FIG. 6 shows a top view onto the mold core from FIG. 5.

FIG. 6 illustrates a top view onto the mold core 72 and, resp., onto the mold core 72 in an injection molding tool 70, as afore-described concerning FIG. 5. FIG. 6 clearly illustrates the arrangement of the three angular ejectors 74 radially circumferentially at equal spaces from each other so that a respective angular distance of 120° of one angular ejector 74 from the radially closest angular ejector 74 is formed. In addition, in FIG. 6 also a corresponding T-shaped hollow inside the mold core 72 is visible which, when filled with plastic material, enables the complementary extension 60 of the socket 10 to be configured. The extension 60 is shown in representations for the socket 10 in the FIGS. 1 and 2. Also, the two bores 82 into which the two pins 26 can be inserted in the direction of the plane of projection are shown in FIG. 6.

The invention claimed is:

1. A pyrotechnical connecting interface of a pyrotechnical vehicle safety device, comprising a socket which includes a housing with a plug-in port for accepting a plug and comprising pins ending in the plug-in port via which electricity for activating a pyrotechnical charge can flow, the housing being an injection-molded housing and having a peripheral wall which surrounds end portions of the pins at a distance thereof and which ends in an end face on the side facing the plug, wherein three radial undercuts being spaced apart from each other in the peripheral direction for interlocking engagement with three associated latching fingers on the plug side are formed on the inner face of the peripheral wall, wherein said three undercuts are entirely closed axially and radially outward and are manufactured by injection molding.

2. The pyrotechnical connecting interface according to claim 1 wherein the exposed end portions of the pins are located completely inside the plug-in port and/or the pins are embedded in the socket, especially in an end wall of the socket.

3. The pyrotechnical connecting interface according to claim 2 wherein the end wall includes an outer wall portion merging integrally into the peripheral wall and having an opening, and the opening is closed by a stopper cast or injected into the latter through which the pins are protruding.

4. The pyrotechnical connecting interface according to claim 2 wherein the end wall has at least one axial extension asymmetrical toward a central axis, especially a T-shaped extension in the axial view, toward the plug-in pin port in the area of the pins.

5. The pyrotechnical connecting interface according to claim 1 wherein the plug-in port is water-tight except for a port mouth delimited by the peripheral wall.

6. The pyrotechnical connecting interface according to claim 1 wherein the end face is circumferential while it is peripherally closed and planar.

7. The pyrotechnical connecting interface according to claim 1 wherein each of the three undercuts are closed off at their ends close to the end face by a radial delimiting area, especially wherein an opposite delimiting area extends tapered toward the center of the plug-in port.

8. A pyrotechnical connecting device comprising a pyrotechnical connecting interface according to claim 1 wherein a plug insertable into the plug-in port which has at least one head protruding into the plug-in port and including a seat for the pins, wherein the plug has a counter end face which is opposed to the end face of the socket and seals the opposite end face, especially via an O-ring positioned between the counter end face and the end face, in a water-tight manner.

9. The pyrotechnical connecting device according to claim 8 wherein the plug has three axial latching fingers which are integrally formed and each of which includes a hook-shaped end for engaging in the respective undercuts.

10. A process for manufacturing a pyrotechnical connecting interface of a pyrotechnical vehicle safety device, the process comprising the following steps of:
   a) providing an injection molding tool having a mold core having a longitudinal axis, and providing at least one angular ejector which can be moved relative to the mold core; then
   b) arranging the at least one angular ejector on an inner inclined face of the mold core such that a cavity is resulting for a socket to be manufactured by injection molding, wherein the cavity forms an undercut for the socket which is entirely closed axially and radially outward;
   c) filling the cavity with plastic material by one single filling process and thus producing at least one subarea of the socket; subsequently
   d) forming and ejecting the at least one subarea of the socket by moving the at least one angular ejector along the inner inclined face of the mold core in the direction of an ejecting direction, wherein the ejecting direction forms a demolding angle having an angular value between 1° and 10°, especially an angular value from 2° to 5°, with the longitudinal axis of the mold core.

11. The process according to claim 10 wherein in step a) three angular ejectors are provided which can be moved relative to the mold core, wherein in step b) the three angular ejectors are arranged at respective inner inclined faces of the mold core such that the cavity for the socket is resulting, wherein the cavity forms three undercuts separate from each other for the socket, wherein each undercut per se is entirely closed axially and radially outward, and wherein, after filling the cavity, then in step d) the demolding is carried out in such way that the three angular ejectors are moved substantially simultaneously, each angular ejector in the direction of its ejecting direction associated to it, the respective ejecting directions forming a respective demolding angle which has the same angular value between 1° and 10°, especially an angular value from 2° to 5°, with the longitudinal axis of the mold core.

12. The process according to claim 11 wherein each of the three angular ejectors, when viewed in the top view concerning their arrangement on the molded body, is arranged on the respective inner inclined face of the mold core such that the three angular ejectors are positioned relative to each other along a joint imaginary circle at equal radially circumferential distances so that there will form a respective angular distance of 120° from one angular ejector to the next angular ejector located on the imaginary circle.

13. The process according to claim 11 wherein two bores are arranged in the mold core substantially in parallel to the longitudinal axis of the mold core, wherein, prior to the filling of the cavity, in each of the bores a pin via which electricity for activating a pyrotechnical charge can flow is inserted such that the pins abut on, especially project into, the cavity so that, after filling the cavity with plastic material, the subarea of the socket is produced in such a way that the pins are directly embedded in the socket.

\* \* \* \* \*